Figure 1:
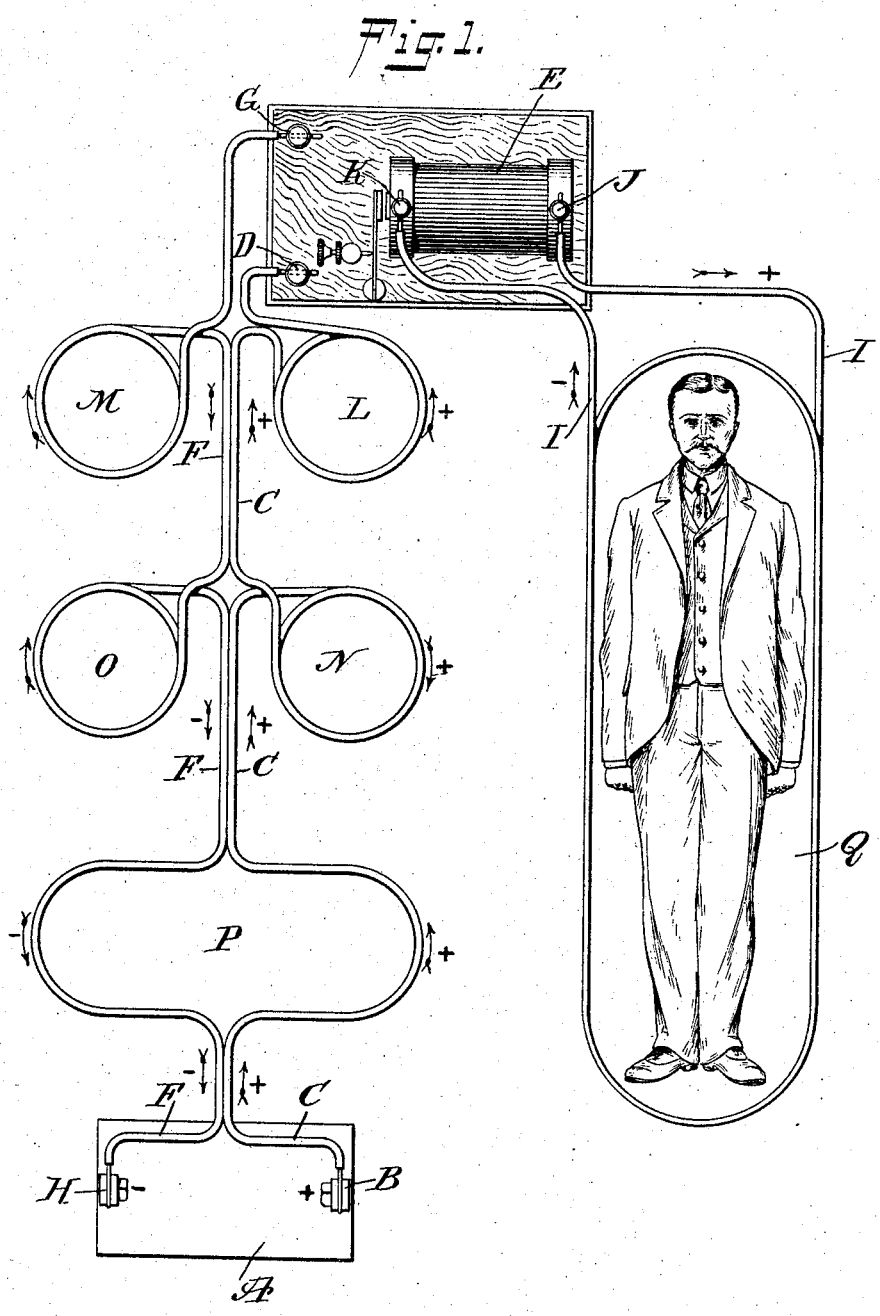

No. 781,448. PATENTED JAN. 31, 1905.
J. McINTYRE.
ELECTROMAGNETIC APPARATUS.
APPLICATION FILED OCT. 29, 1904.

3 SHEETS—SHEET 1.

WITNESSES:
William P. Goebel.
Rev. G. Hosted.

INVENTOR
John McIntyre
BY
ATTORNEYS

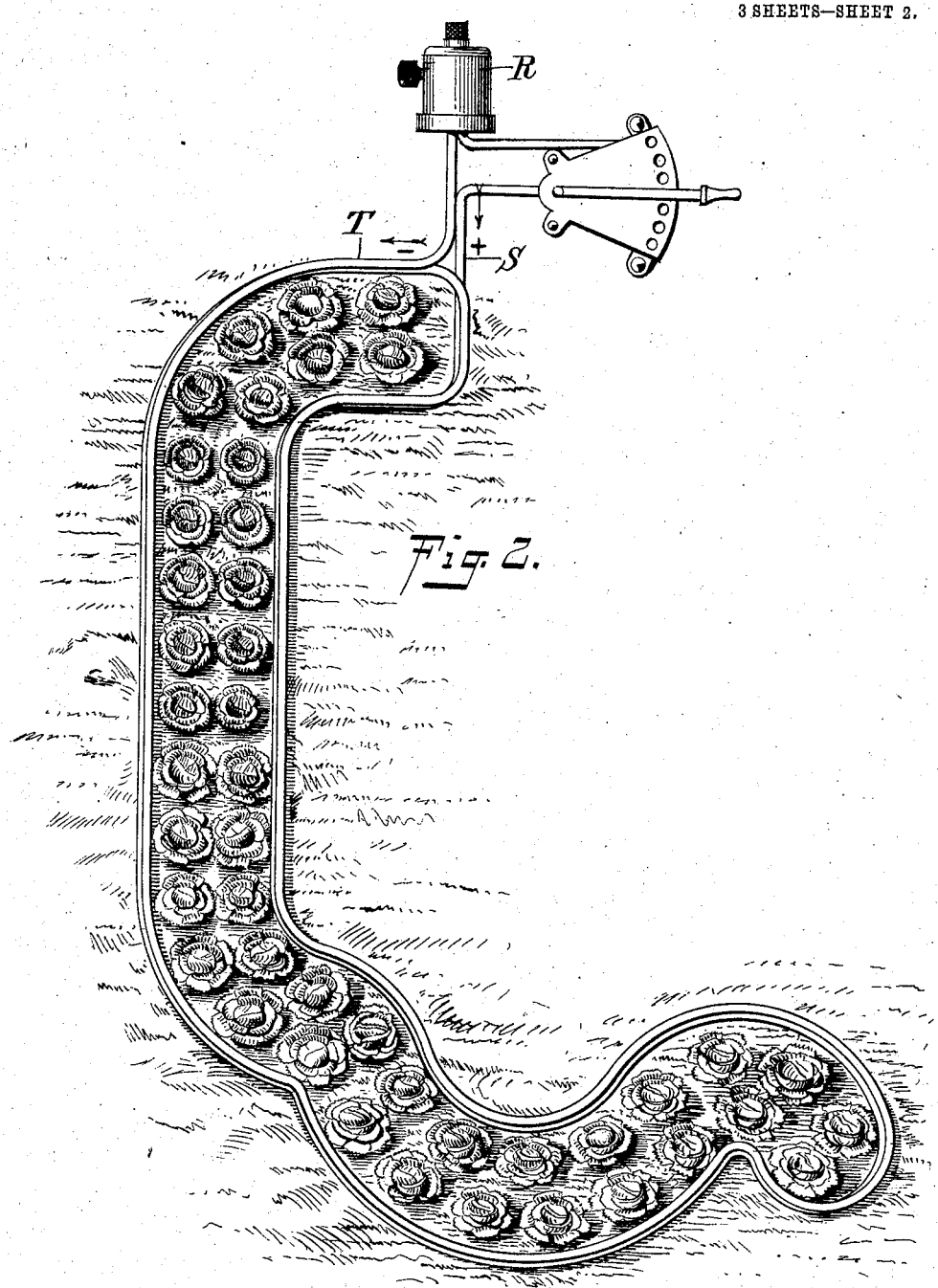

No. 781,448. PATENTED JAN. 31, 1905.
J. McINTYRE.
ELECTROMAGNETIC APPARATUS.
APPLICATION FILED OCT. 29, 1904.
3 SHEETS—SHEET 3.
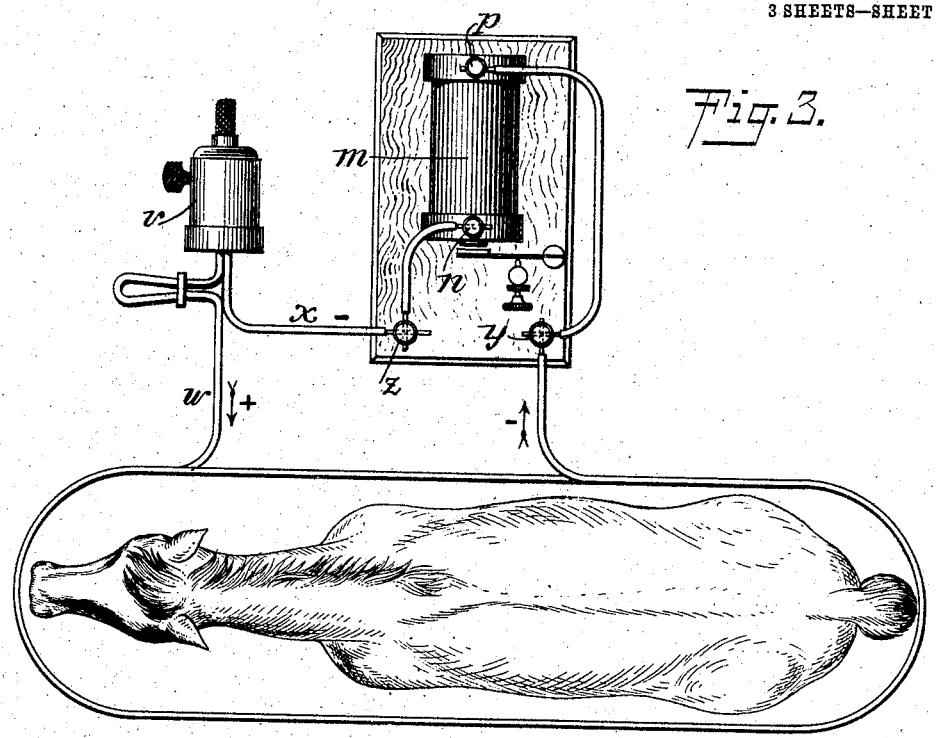
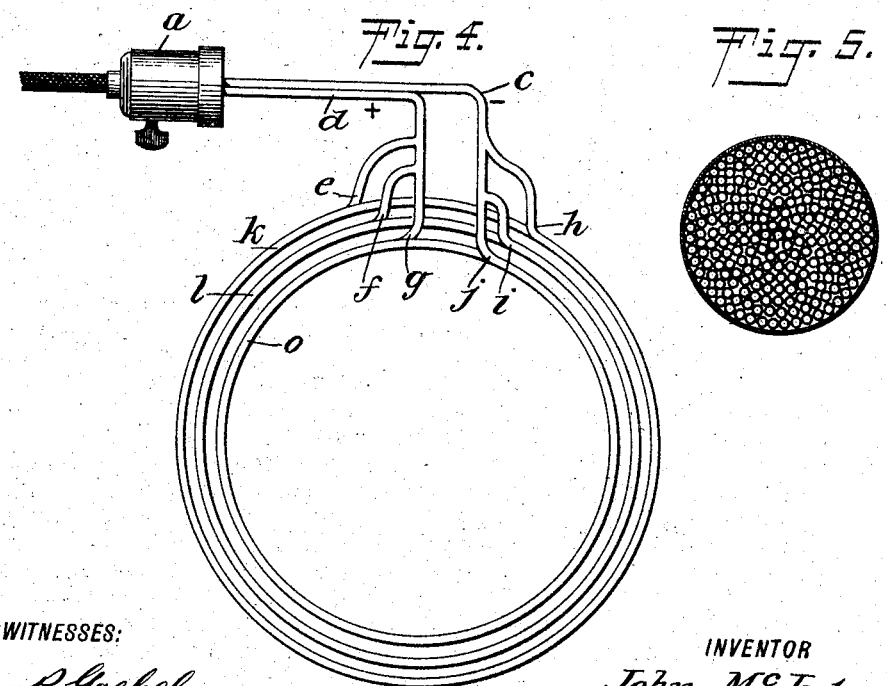
WITNESSES:
William P. Goebel.
Geo. G. Hostler.
INVENTOR
John McIntyre
BY
[signature]
ATTORNEYS No. 781,448. Patented January 31, 1905.

UNITED STATES PATENT OFFICE.

JOHN McINTYRE, OF JERSEY CITY, NEW JERSEY.

ELECTROMAGNETIC APPARATUS.

SPECIFICATION forming part of Letters Patent No. 781,448, dated January 31, 1905.

Application filed October 29, 1904. Serial No. 230,485.

*To all whom it may concern:*

Be it known that I, JOHN McINTYRE, a citizen of the United States, and a resident of Jersey City, in the county of Hudson and State of New Jersey, have invented a new and Improved Electromagnetic Apparatus, of which the following is a full, clear, and exact description.

The object of the invention is to provide a new and improved electromagnetic apparatus designed for stimulating and vitalizing live animal, live vegetable, and other objects and matter by saturating, for instance, the whole human or animal object or the bed-soil of the plant-bed and the plants uniformly with electricity in its normal condition magnetism by the employment of frequency magnetism derived from an electric cable-coil in circuit with a source of variable electric energy or frequency electric current.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement, showing the apparatus employed for treating a human being. Fig. 2 is a plan view of the improvement, shown arranged for treating a bed of plants. Fig. 3 is a plan view of the improvement, shown arranged for treating a horse. Fig. 4 is a plan view of a modified form of the apparatus, and Fig. 5 is a cross-section of the cable-coil.

In Fig. 1 is illustrated an electric source of energy in the form of an electric battery A; but it may be any other suitable source, and the positive pole B of this battery is connected by a flexible conductor C with the primary terminal D of an induction-coil E of any approved construction, and the other primary terminal, G, of the induction-coil E is connected by a negative flexible conductor F with the negative pole H of the battery, thus completing the primary circuit. A flexible conductor I connects with secondary terminals J and K on the induction-coil E, thus completing the secondary electric circuit. Each of the flexible conductors C, F, and I is in the form of a cable, (see Fig. 5,) the conductors C and F having portions formed into cable-coils L, M, N, O, and P and the conductor I having a portion formed into a cable-coil Q. The term "cable-coil" denotes a plurality of insulated conductors, each forming a strand of a cable which is laid into a desired number of convolutions to form each cable-coil capable of producing an effective field of magnetism whenever an electric current is sent through the flexible conductor F, C, or I. Within the magnetic field of the cable-coils L, M, N, O, and P, or any of them, may be placed an object or objects for receiving magnetism, and in a like manner the cable-coil Q may be arranged around a human being or around a bed of plants or other object to bring the same within the magnetic field or sphere of magnetic influence of the cable-coil. The portions of the positive and negative conductors not required to apply magnetism should be as close to each other as the necessary insulation will allow and the current flowing oppositely in each, (the arrows indicate the direction of the current.) This will practically prevent radiation of magnetism from that portion, and wherever it is desirable to coil a portion of the positive and negative conductors adjacent to each other in the same circuit to get the best combined effect of the magnetism from said portion they should each be coiled in the same direction, and to get the best effect of the magnetism where only one coil is formed in either adjacent conductor in the circuit it should be coiled so that the current in the nearest portion of the other conductor shall flow in the same direction as the current in the latter conductor. Whenever the positive and negative conductors contact with each other when the current is flowing in opposite directions in each, (as shown by the arrows,) the radiation of magnetism from both will be retarded or practically *nil*. The size of the plant-bed or portion of soil or other object bathed with the magnetism is regulated by the quantity and pressure of the current and the length and size of the conductor.

When the ordinary alternating current of electric-lamp circuits is employed in my method, there may be as a regulator of the current a lamp or lamps burning in the circuit and also a cut-off, and when the direct electric current of electric-lamp circuits or the current from an electric battery is employed in my method it must be transformed into a frequency current by a transformer on the circuit formed by the conductors and a cut-off or poles of the battery. There may be, too, in addition to the transformer a lamp or lamps burning in the circuit as a governor. When using the ordinary direct electric-lamp current, other well-known governors, such as a rheostat, might be used on the circuit instead of a lamp or lamps.

The coils or forms described by the conductors are preferably coiled as compactly into cable form as the necessary length of conductor will allow, and the conductor is insulated. The magnetic field created may have any desirable form or path described by the conductor, and the positive and negative conductors are, when the electric current is flowing in opposite directions in each conductor, practically dead to the radiation of magnetism until they are separated, and whenever the charged positive and negative conductors are thus separated magnetism will be radiated from both and not until then. Magnetism may be radiated from either or both the primary and the secondary conductors in circuit on an induction-coil transformer at the same time. By turning the coils L and M onto their sides nearest to each other, so that they will present a side elevation with their planes facing each other, the magnetic field between them will be stronger than it is in their present position. By coiling L and M in the same direction, as illustrated, the magnetic field between them will be stronger than if each was coiled in an opposite direction and both coils will be about equal in magnetic strength; but if the coils are coiled in opposite directions, as in N and O, then the coil on the positive conductor C will emanate a much stronger magnetic field than the coil on the negative conductor F, and the magnetic field between the coils N and O will be much weaker than between the coils L and M. If the coils L and M be placed fairly upon each other while retaining their present planes, there will practically be no radiation of magnetism from either; but if either be turned over fairly on the other the magnetic field will practically be twice as dense as from the positive alone if the pressure and quantity of the current is the same in each case.

In the coils N and O the magnetic field is much stronger on the positive coil N than in the negative coil O, and the magnetic field between them is weak; but if they be placed fairly upon each other (not turned over upon each other) while retaining their present planes the magnetic field will practically be twice as dense as from the positive coil alone; but if they be folded over fairly upon each other the magnetic field will be practically nil, and if they be turned up upon their sides nearest to each other, so as to show a side elevation, with their planes opposite, the positive will still project a magnetic field much stronger than the negative.

The divided coil P creates a positive and negative magnetic field of nearly equal force within or adjacent to its divided circuit; but if either half be turned over fairly upon the other half neither will practically project magnetism.

Fig. 2 illustrates my process when using the ordinary alternating electric-lamp current. R may be an ordinary cut-off plug and socket or its equivalent or a current-regulator connected to said lamp-current; S the positive and T the negative conductors or coil forming a circuit with said cut-off or regulator.

Fig. 3 illustrates my process when using the ordinary direct electric-lamp current. *v* may be, as R is in Fig. 2, an ordinary cut-off plug and socket or its equivalent or a current-regulator connected to said lamp-current; *w*, the positive and *x* the negative conductors or coil, forming a circuit with said cut-off or regulator in conjunction with the terminals *y* and *z* of a transformer *m*, having terminals *n* and *p* and which transforms the direct current into a frequency one; but any other suitable means may be employed to frequency the current. Within or adjacent to the circuit, as already described in Figs. 1 and 2, may be placed any desirable object to receive magnetism. I call it "within the circuit" if the object operated upon is exposed to the centralized magnetic lines of force from the coils.

In these statements it is understood that the conductors or coils are in practical working proximity to each other and the object. If a smaller coil is formed by all of the conductors in the large coil, the magnetic field from said small coil will be denser than from the large coil and contracted transversely; but the projection of its lines of force axially will be practically the same as in the larger coil, and if the two conductors, positive and negative, be farther separated or brought nearer to each other so will the magnetic field between them be less dense or denser and the total area of the magnetic field greater or less.

When transforming the direct current into a frequency one by the Ruhmkorff induction-coil, I find that the most practical, efficient, and commercial work is accomplished by employing the primary-current conductors to apply magnetism upon the object, especially when the object requires a strong magnetic influence, much stronger than the secondary-current conductor can create from the influence it receives from the same machine and current. Besides, the secondary-current conductor or coil requires many times the length of conductor that the primary current requires to produce as strong and as dense a magnetic field.

The cable form of coil and its pliancy is an important feature of my invention. For instance, the oblong coil Q in Fig. 1 may be increased or lessened in breadth. The former would lessen and the latter increase the magnetic effect on the object under treatment within the coil. The pliant coil can accommodate itself to either regular or irregular forms, so that the whole length of the coil shall contact with the object under treatment, and the whole contacting portion of the object with the cable-coil shall receive equal magnetic force. When a human being is the object under treatment, my experience has shown that if the conductor or cable-coil is parallel with the length of the body the best effect is then attained, and for the same reason I think that a charged electric wire produces in a dead wire parallel with it and near enough to it an electric current. For this reason also it is advantageous to have the pliable cable-coil. When the induction-coil transformer is used on the circuit, one form of which is shown in Figs. 1 and 3, it is advantageous to connect the secondary terminals N and R with the primary terminals $z$ and $y$, as shown in Fig. 3. In this way the current from the secondary coil will increase the effect of the primary current in the pliable coil; but if the secondary terminals are not connected in this manner or to a separate coil I, as shown in Fig. 1, or its circuit closed by merely connecting its terminals then said current is practically of no use for the purposes described.

Fig. 4 illustrates my process with coils in multiple. $a$ may be, as R is in Fig. 2, an ordinary plug and socket or its equivalent connected to any suitable source of electric energy. $d$ is the positive and $c$ the negative conductor, with their respective connections $e, f, g, h, i$, and $j$ to the respective coils $k, l$, and $o$, thus placing each coil in circuit with the electric current through said plug. By this multiple method of operating the coils there is practically no limit to the magnetic influence that can be exerted on an object if the leads from the main line to the switch or cut-off and from the switch to the coils or current-regulator that may be attached to the coils has sufficient cross-section and the electric current ample. The efficient limit of a single coil or of coils in series can be added indefinitely with the coils in multiple under the foregoing described conditions, and the quantity and density of magnetism from them will be in proportion, practically, to the number of coils of equal power so connected if a similar electric current is also proportionately supplied and the coiling and position of the coils themselves be in proper relation to each other, as previously described. The magnetic force in both methods can be increased by increased energy in the electric current supplied, and by this compounding of the coils the magnetic field can be made as dense and strong as desired and to float suitable objects.

For simplicity of illustration I have shown the coils in Fig. 4 adjacent to each other; but the compounding or multiple effect of the coils is greater if they are in contact and positioned upon each other. The farther they are separated from each other the less dense will be the magnetic field.

By the term "frequency current" I mean any current that has an unsteady flow—for instance, the so-called "alternating current."

A regulator, knife-switch, fuse, or their equivalent may be employed on the coils connected in multiple to open or close the electric circuit on all or each singly.

Having thus described my invention, I claim as new and desire to secure by Letters Patent—

1. A means for treating live animal, live vegetable or other objects, comprising a pliable cable-coil, and a frequency source of electrical energy in circuit with the said coil.

2. A means for treating live animal, live vegetable or other objects, comprising a frequency source of electrical energy, and pliable cable-coils arranged in series and in circuit with the said frequency source of electrical energy.

3. A means for treating live animal, live vegetable or other objects, comprising a frequency source of electrical energy, and multiple cable-coils in circuit with the said frequency source of electrical energy.

4. A means for treating live animal, live organic vegetable or other objects, comprising a frequency source of electrical energy, a primary circuit connected with the said frequency source of electrical energy, and a secondary circuit induced by the said primary circuit, the conducting-cables of the said circuits being arranged in coils for surrounding the object, the cables being flexible to allow any portion thereof being brought nearer to or farther from the object.

In testimony whereof I have signed my name to this specification in the presence of two subscribing witnesses.

JOHN McINTYRE.

Witnesses:
  THEO. G. HOSTER,
  EVERARD BOLTON MARSHALL.